United States Patent
Carroll et al.

(10) Patent No.: US 11,010,207 B2
(45) Date of Patent: May 18, 2021

(54) METERING SOFTWARE FOR CLOUD AND NON-CLOUD COMPUTER SYSTEMS

(71) Applicant: International Business Machines Corporation, Armonk, NY (US)

(72) Inventors: Paul Lloyd Hawes Carroll, Lakeway, TX (US); Shikha Srivastava, Cary, NC (US); Charles A. Quincy, Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 63 days.

(21) Appl. No.: 16/452,588

(22) Filed: Jun. 26, 2019

(65) Prior Publication Data

US 2020/0409769 A1 Dec. 31, 2020

(51) Int. Cl.
*G06F 9/50* (2006.01)
*G06F 11/30* (2006.01)
*G06F 11/34* (2006.01)

(52) U.S. Cl.
CPC .......... *G06F 9/5083* (2013.01); *G06F 11/302* (2013.01); *G06F 11/3433* (2013.01)

(58) Field of Classification Search
CPC .................................................. G06F 9/5083
See application file for complete search history.

(56) References Cited

U.S. PATENT DOCUMENTS

| | | | |
|---|---|---|---|
| 9,514,387 B2 | 12/2016 | Eaton | |
| 9,971,544 B1 | 5/2018 | Johnson et al. | |
| 2007/0011330 A1* | 1/2007 | Dinker | G06F 11/3409 709/226 |
| 2011/0055378 A1 | 3/2011 | Ferris | |
| 2012/0226808 A1 | 9/2012 | Morgan | |
| 2013/0185413 A1 | 7/2013 | Beaty et al. | |
| 2015/0242227 A1* | 8/2015 | Nair | G06F 12/0802 718/1 |

OTHER PUBLICATIONS

"A System and Method to Dynamically Alter the Virtual Hardware Resource of Instance in Cloud", An IP.com Prior Art Database Technical Disclosure, Authors et. al.: Disclosed Anonymously, IP.com No. IPCOM000227682D, IP.com Electronic Publication Date: May 13, 2013, 7 pages.
"Cloud Computing Component-Workload-Client Mapping in a Multi-Tenant (Public Instances) Environment", An IP.com Prior Art Database Technical Disclosure, Authors et. al.: Disclosed Anonymously, IP.com No. IPCOM000239304D, IP.com Electronic Publication Date: Oct. 28, 2014, 3 pages.

(Continued)

*Primary Examiner* — Charlie Sun
(74) *Attorney, Agent, or Firm* — David B. Woycechowsky

(57) ABSTRACT

Usage metering software for metering usage of a single application, where portions of the application run on at least two different platforms. The usage metric values are aggregated for the purposes of planning, billing the client or the like. In some embodiments, at least one platform of the multiple platforms is a cloud platform and at least one platform of the multiple platforms is a non-cloud platform.

14 Claims, 4 Drawing Sheets

(56) References Cited

OTHER PUBLICATIONS

"Method and System for Automated Problem Detection in a Multi-System Distributed Cloud Computing Environment", An IP.com Prior Art Database Technical Disclosure, Authors et. al.: Disclosed Anonymously, IP.com No. IPCOM000251608D, IP.com Electronic Publication Date: Nov. 15, 2017, 4 pages.

"Systems Method and Apparatus for Cloud User Experience Optimization", An IP.com Prior Art Database Technical Disclosure, Authors et. al.: Disclosed Anonymously IP.com No. IPCOM000244663D, IP.com Electronic Publication Date: Jan. 6, 2016, 7 pages.

Ahson, et al., "Cloud Computing and Software Services—Theory and Techniques", CRC Press, Taylor & Francis Group, Boca Raton, FL, © 2011 by Taylor and Francis Group, LLC.

Carlini, et al., "Challenges to Be Addressed for Realising an Ephemeral Cloud Federation", ResearchGate, Oct. 24, 2016, 7 pages.

Coyne, et al., "IBM Private, Public, and Hybrid Cloud Storage Solutions", International Technical Support Organization, Apr. 2018, Fifth Edition (Apr. 2018), This document was created or updated on Nov. 27, 2018, 206 pages.

IBM, "IBM Cloud Private V3.1 strengthens its integrated cloud platform with application modernization for more effective, agile development with microservices", IBM United States Software Announcement 2180441, Sep. 11, 2018, 13 pages, Grace Period Disclosure document.

* cited by examiner

METERING SOFTWARE FOR CLOUD AND NON-CLOUD COMPUTER SYSTEMS

STATEMENT ON PRIOR DISCLOSURES BY AN INVENTOR

The following disclosure(s) are submitted under 35 U.S.C. 102(b)(1)(A) as prior disclosures by, or on behalf of, a sole inventor of the present application or a joint inventor of the present application: IBM United States Software Announcement 218-441, dated Sep. 11, 2018 (IBM is a registered trademark of International Business Machines Corporation); IBM Cloud Private V3.1 strengthens its integrated cloud platform with application modernization for more effective, agile development with microservices.

BACKGROUND

There are two types of computer system that may be used at the server side to deliver data, information and/or computational services over a computer network (such as the Internet): non-cloud and cloud. Non-cloud server computer systems (sometimes herein referred to as "non-cloud framework type computer systems" or "NCFCSs") are an older type of server system where most, if not all, of the processing, computational, data communication, memory and/or storage work of the server system is done on physical computer components, such as physical server computers and physical data storage devices. In NCFCSs, applications may run through an operating system and/or kernel or directly on the processor (sometimes referred to as "running on bare metal").

In cloud framework type computer systems ("CFCSs"), at least a substantial portion of the processing and computational work of the server system is performed by virtualized computer components (for example virtual machines (VMs) and/or containers) that run on a set of physical host machines.

The term "platforms" is hereby defined as any platform for running software. Examples include bare metal, IBM x86, IBM Power, IBM Z operating system, VMs, containers, cloud foundry, public cloud, private cloud and hybrid cloud. Different platforms may be associated with different providers, although a single provider may have more than one platform. A "non-cloud platform" is hereby defined as any platform that runs application on an NCFCS. A "cloud platform" is hereby defined as any platform that runs applications on a CFCS.

Modern software applications can be run on platforms designed for CFCSs. The containers and/or VMs of the CFCs are ephemeral, meaning that functionality can rapidly be started and terminated based on demand for scaling, failover, geographic load balancing and/or other reasons. These ephemeral VMs, containers and/or other virtualized components are herein referred to as "ephemeral workloads." These ephemeral workloads can be started on independent and even dissimilar platforms. That is to say, each short lived process could be created on a different cloud platform such as IBM public or private cloud, Amazon cloud, Microsoft cloud, or a privately hosted cluster of physical host machines. In some currently convention CFCSs, workloads forming the application could even be running on bare-metal (usually not as short-lived) with additional workloads added or removed in a cloud for on demand scalability and load balancing. Typically, a large multiplicity of ephemeral workloads represent a single "application" or "application suite." Typically, a client is charged for use of an application suite based, in some sense, on the amount of usage of the application, or application suite. As is known in the art, different operational parameters, or different combinations of operational parameters control how much a client is charged for performing the ephemeral workloads that, collectively, constitute the client's use of the application or application suite.

The method for determining the amount of resource usage caused by running an application, or application suite, is sometimes herein referred to as metering. This cost may sometimes be the basis for charging a client for services rendered, but may also be used for other purposes like planning or monitoring. The operational parameters, or "metrics," appropriate for metering each application are also distinct. Some applications may be metered in simple terms such as the total number of transactions processed, no matter where the processing is done. In such a case it would not matter whether there were two workloads handling the processing or fifty, whether the workloads were running on a cloud or bare-metal. Frequently, the key measurement is dependent on the resources consumed. An application may be licensed on the number of processing cores it has available for example, in which case two workloads with access to four cores each would be measured significantly different compared to fifty workloads with half a core each.

Operational parameters typically used for metering typically include one, or more, of the following: (i) whether the workloads are running at the same time; (ii) how long each workload is running; (iii) maximum cores available to the client's use of the application; (iv) total core-hours involved in the client's use of the application; (v) total application-specific operations performed; (vi) maximum number of concurrent workloads; and/or (vii) maximum cores actually utilized by the application (as opposed to cores that are available to the application).

SUMMARY

According to an aspect of the present invention, there is a method, computer program product and/or system that performs the following operations (not necessarily in the following order): (i) running a first portion of an application on behalf of a first client on a first non-cloud platform; (ii) during the running of the first portion, monitoring the running of the first portion to determine a first set of metered parameter value(s) respectively corresponding to a set of parameter(s); (iii) running a second portion of the application on behalf of the first client on a first cloud platform; (iv) during the running of the second portion, monitoring the running of the second portion to determine a second set of metered parameter value(s) respectively corresponding to the set of parameter(s); and (v) determining aggregate parameter value(s) with the aggregation including combining at least the parameter value(s) of the first and second sets of parameter value(s).

According to a further aspect of the present invention, there is a method, computer program product and/or system that performs the following operations (not necessarily in the following order): (i) running a first portion of an application on behalf of a first client on a first cloud platform; (ii) during the running of the first portion, monitoring the running of the first portion to determine a first set of metered parameter value(s) respectively corresponding to a set of parameter(s); (iii) running a second portion of the application on behalf of the first client on a second cloud platform; (iv) during the running of the second portion, monitoring the running of the second portion to determine a second set of metered parameter value(s) respectively corresponding to the set of parameter(s); and (v) determining aggregate parameter value(s) with the aggregation including combining at least the parameter value(s) of the first and second sets of parameter value(s).

According to a further aspect of the present invention, there is a method, computer program product and/or system that performs the following operations (not necessarily in the following order): (i) running a first portion of an application on behalf of a first client on a first non-cloud platform; (ii) during the running of the first portion, monitoring the running of the first portion to determine a first set of metered parameter value(s) respectively corresponding to a set of parameter(s); (iii) running a second portion of the application on behalf of the first client on a second non-cloud platform; (iv) during the running of the second portion, monitoring the running of the second portion to determine a second set of metered parameter value(s) respectively corresponding to the set of parameter(s); and (v) determining aggregate parameter value(s) with the aggregation including combining at least the parameter value(s) of the first and second sets of parameter value(s).

DETAILED DESCRIPTION

Figure 1:
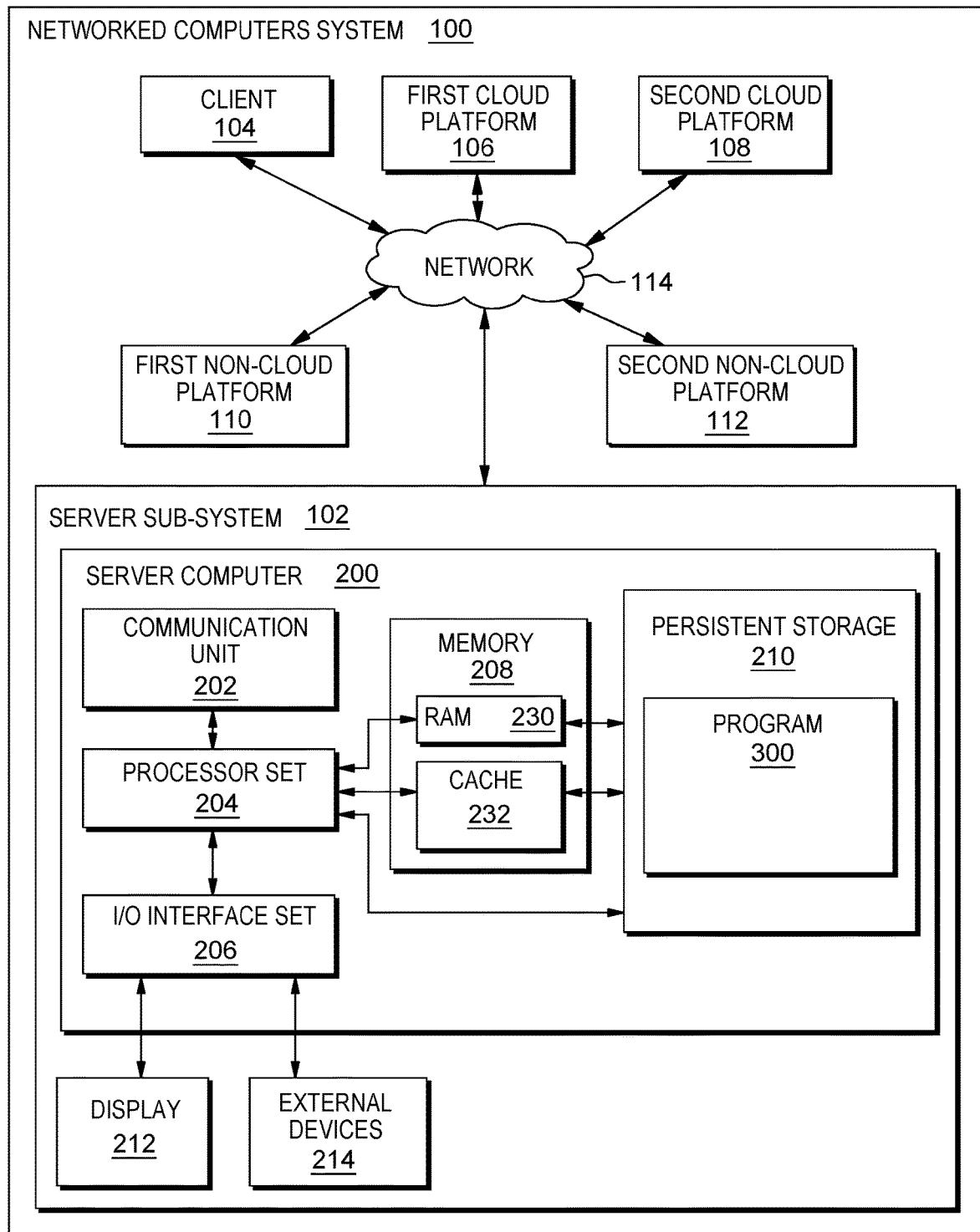
FIG. 1 is a block diagram view of a first embodiment of a system according to the present invention.

Some embodiments of the present invention are directed to metering software for metering usage of a single applications, where portions of the application run on at least two different platforms. The usage metric values are aggregated for the purposes of planning, billing the client or the like. In some embodiments, at least one platform of the multiple platforms is a cloud platform and at least one platform of the multiple platforms is a non-cloud platform. This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: server subsystem 102; client subsystem 104; first cloud platform subsystem 106; second cloud platform subsystem 108; first non-cloud subsystem 110; second non-cloud platform subsystem 112; communication network 114; server computer 200; communication unit 202; processor set 204; input/output (I/O) interface set 206; memory device 208; persistent storage device 210; display device 212; external device set 214; random access memory (RAM) devices 230; cache memory device 232; and program 300.

Subsystem 102 is, in many respects, representative of the various computer subsystem(s) in the present invention. Accordingly, several portions of subsystem 102 will now be discussed in the following paragraphs.

Subsystem 102 may be a laptop computer, tablet computer, netbook computer, personal computer (PC), a desktop computer, a personal digital assistant (PDA), a smart phone, or any programmable electronic device capable of communicating with the client subsystems via network 114. Program 300 is a collection of machine readable instructions and/or data that is used to create, manage and control certain software functions that will be discussed in detail, below, in the Example Embodiment sub-section of this Detailed Description section.

Subsystem 102 is capable of communicating with other computer subsystems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
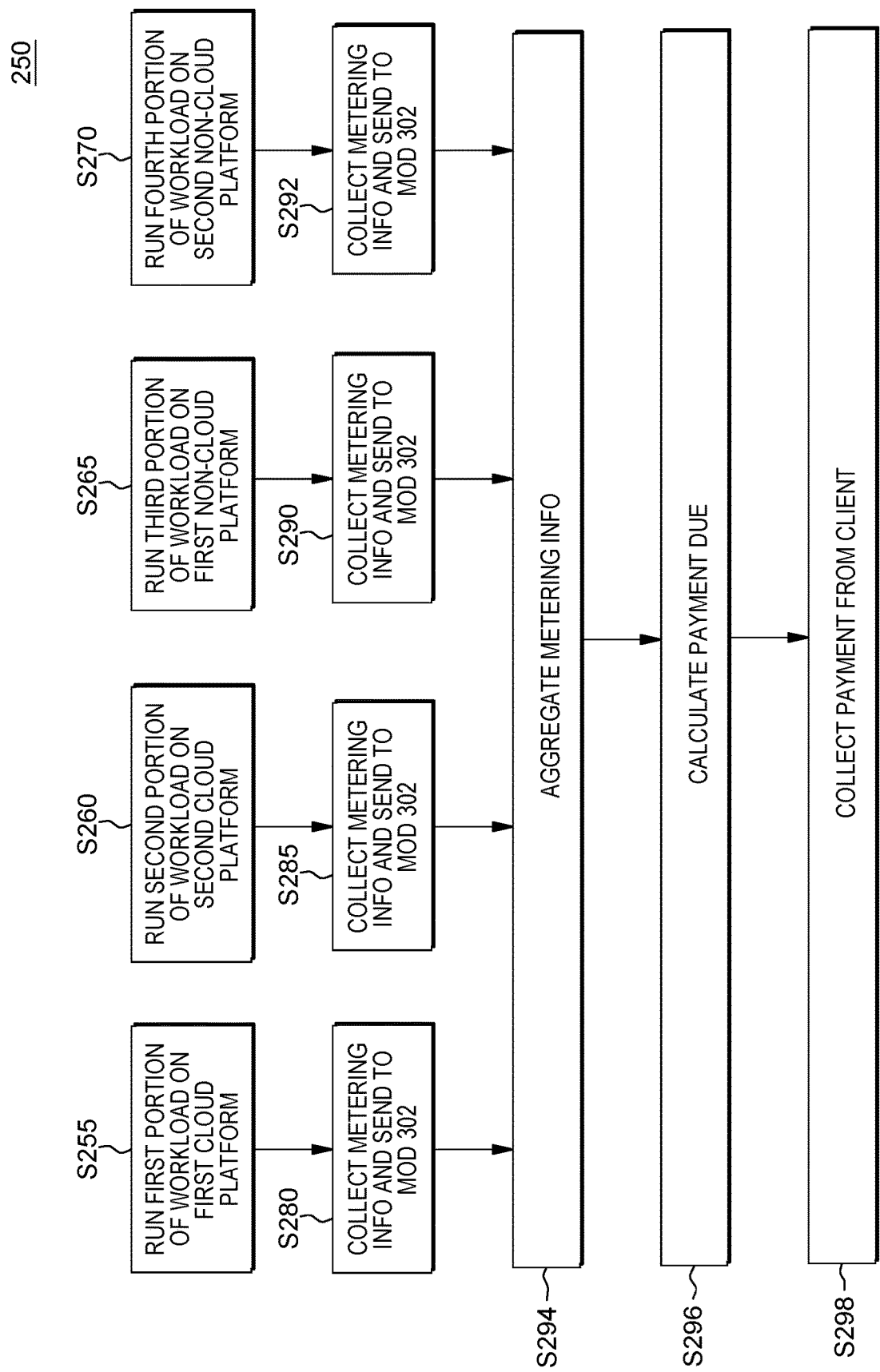
FIG. 2 is a flowchart showing a first embodiment method performed, at least in part, by the first embodiment system.
Figure 3:
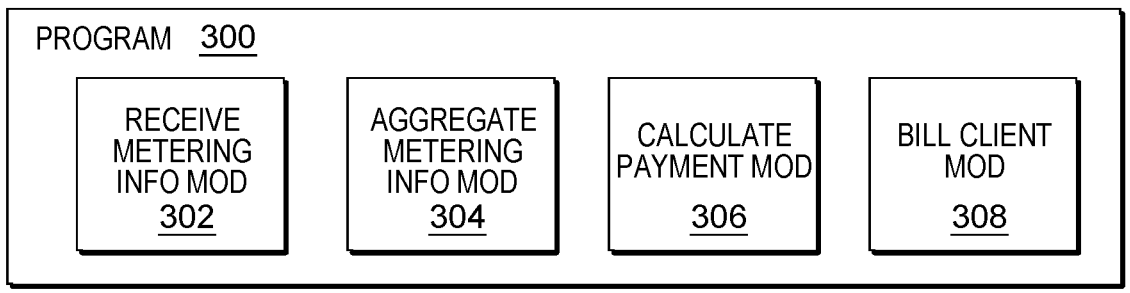
FIG. 3 is a block diagram showing a machine logic (for example, software) portion of the first embodiment system.

FIG. 2 shows flowchart 250 depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S255, where a first portion of client's first workload (see client subsystem 104 in FIG. 1) is run on a first cloud platform (see first cloud platform subsystem 106 in FIG. 1). In this example, the first cloud platform: (i) is dominated by virtualized resources because most of the computational work is done by virtual machines (VMs); and (ii) is provided by a first cloud services vendor. In this example, the client is an end user, and the client's workload is the use of an office software suite of applications (word processing, spreadsheet and image processing) provided and manage by a broker entity that owns and controls server subsystem 102.

Performed in a temporally overlapping manner with operation S255, at operation S260 a second portion of client's first workload is run on a second cloud platform (see second cloud platform subsystem 108 in FIG. 1). In this example, the second cloud platform: (i) is dominated by virtualized resources because most of the computational work is done by Docker containers; and (ii) is provided by a second cloud services vendor.

Performed in a temporally overlapping manner with operations S255 and S260, at operation S265 a third portion of client's first workload is run on a first non-cloud platform (see first non-cloud platform subsystem 110 in FIG. 1). In this example, the first non-cloud platform: (i) is provided by a set of computer programs (not separately shown in FIG. 1) running on a host operating system (not separately shown in FIG. 1); and (ii) is provided by a first non-cloud services vendor.

Performed in a temporally overlapping manner with operations S255, S260 and S265, at operation S270 a fourth portion of client's first workload is run on a second non-cloud platform (see second non-cloud platform subsystem 112 in FIG. 1). In this example, the second non-cloud platform: (i) is provided by the "bare metal" of a processor (not separately shown in FIG. 1); and (ii) is provided by a second non-cloud services vendor.

During and/or after operations S255, S260, S265 and S270 are performed, the following operations are performed: (i) operation S280 where first metering information, which quantifies the usage of the resources of the first cloud subsystem by the first portion of the first workload, is sent from first cloud subsystem 106 to receive metering information module ("mod") 302 according to a first data format and first syntax; (ii) operation S285 where second metering information, which quantifies the usage of the resources of the second cloud subsystem by the second portion of the first workload, is sent from second cloud subsystem 108 to mod 302 according to a second data format and second syntax; (iii) operation S290 where third metering information, which quantifies the usage of the resources of the first non-cloud subsystem by the third portion of the first workload, is sent from first non-cloud subsystem 110 to mod 302 according to a third data format and third syntax; and (iv) operation S292 where fourth metering information, which quantifies the usage of the resources of the second non-cloud subsystem by the third portion of the first workload, is sent from second non-cloud subsystem 112 to mod 302 according to a fourth data format and fourth syntax.

Processing proceeds to operation S294, where aggregate metering info mod 304 aggregates the metering info received by mod 302 from the four platforms 106, 108, 110, 112. In this example, the aggregated metering info includes aggregated data for each of the following metrics: total core hours, total hours, concurrent maximum available cores, and/or concurrent maximum used cores.

Processing proceeds to operation S296 where the amount that the client owes the broker entity for use of the various cloud and non-cloud platforms is calculated by calculate payment mod 306. As shown in screen shot 400 of FIG. 4, in this example, a total cost incurred for a first workload is calculated, as well as separate line item costs for each of the four different platforms used in performing the first workload. Alternatively, only a total cost may be calculated. As a further alternative, the cost may be calculated based on a set of workloads (for example, all workloads run by the client in the month of September).

Figure 4:
FIG. 4 is a screenshot view generated by the first embodiment system.

Processing proceeds to operation S298, where bill client mod 308 bills the client for the multiple platform work performed under management of the broker entity (see screen shot 400 of FIG. 4). Alternatively, the broker entity may own and/or control one, or more, of the platforms used in performing the client's workload(s).

III. Further Comments and/or Embodiments

Some embodiments of the present invention may recognize one, or more, of the following challenges, shortcomings, opportunities for improvement and/or features of the currently conventional state of the art: (i) the metering rules set forth, above, in the Background section, present distinct challenges to metering an application and determining utilization for planning purposes; (ii) the metering rules set forth, above, in the Background section, present distinct challenges to metering an application and determining utilization for monitoring purposes; and/or (iii) the metering rules set forth, above, in the Background section, present distinct challenges to metering an application and determining utilization for verifying license compliance.

Some embodiments of the present invention are directed to a system for metering applications where various portions of the application may run on both NCFCSs and CFCSs. In some embodiments, the metering techniques of the present invention may overcome the problems of distributed and dissimilar platforms, ephemeral workloads and consistent data aggregation over time.

Some embodiments of the present invention may include one, or more, of the following features, characteristics and/or advantages: (i) being cloud platform agnostic; (ii) addresses short-lived nature of workloads, relying on totals for a "service" (application) that the platform calculates opaquely; (iii) addresses "services" (applications) that span cloud providers; (iv) instead just brings separate "services" together into a single report; and/or (v) addresses workloads that span multiple clouds.

Some embodiments of the present invention may include one, or more, of the following features, characteristics and/or advantages: (i) collects software utilization via pushed data from ephemeral workloads on independent and possibly dissimilar hosting environments (cloud, VM (Virtual Machine), or bare metal); (ii) handles workloads explicitly instrumented to send metering data rather than relying on platform-specific tooling; (iii) uses a combination of a metering agent (reader) and/or pushed data; (iv) correlates ephemeral workloads into licensed groups (by product, ID (identification), owner, or other); (v) has the ability to determine that dozens of containers started at different times on different platforms all compose the same "application"; (vi) finds total metered value over time based on concurrency (by concurrent total, concurrent max, shared total, or other); (vii) determines statistics for time intervals; (viii) for applications that need metering based on the total CPU (Central Processing Unit) hours consumed, utilization data from all transient workloads in the application are combined (value and duration) to find the total; (ix) handles applications that need metering based on the maximum number of CPUs used must find the maximum total value from utilization that may have overlapping intervals; and/or (x) handles different aggregations depending on metric (core-hours may use concurrent total, while memory may use concurrent max, etc.).

In one embodiment, the framework outlined above allows applications to freely move their component workloads from platform to platform to satisfy any failover, scaling, availability, etc. goals while maintaining consistent and accurate metering at the application level. Existing solutions are either unable to handle multiple platforms, or unable to bring the data together at the application level, or unable to handle metering non-platform specific attributes of the application.

In this embodiment of the present invention, applications are instrumented to send metering data workload startup and shutdown and at intervals in between. For example, on startup, each short-lived workload sends a 'startup' payload with identifying details and details about the type of metrics to be sent and how they should be aggregated. Every short interval thereafter (5 minutes), the short lived workloads sends a 'usage' payload with start time, end time, and metric values. When the container is terminated, the short lived workload sends a final 'usage' payload for the final interval.

In some embodiments, metering API (application programming interface) endpoints accept 'startup' and 'usage' payloads and save data to a shared datastore. On periodic intervals or on demand, a metering daemon aggregates the data to: (a) discover known applications from the shared datastore, (b) process utilization data for each application in desired intervals (for example, months) according to aggregation rules provided by the application itself or user input (for example, concurrent maximum value for one metric, and/or total value times duration for another metric), and (c) store or display aggregations results. Some embodiments of the present invention aggregate metered values for the application (for example, maximums or totals) in parent groups and stores or displays the results. For example, some embodiments, after calculating a concurrent maximum memory usage for each application, sum the maximums in groups based on owning team or customer. Some embodiments use a combination of instrumented applications and platform specific agents that can automatically meter workloads by tight integration with platform specific APIs.

The following is an example implementing the present invention: (i) an end user is licensed to run a piece of software (a "workload") on up to N cores, or have to pay $N per core that the end user runs it on; (ii) the end user needs to run the workload on a combination of IBM Cloud Private containers, bare metal servers, AWS (Amazon Web Services) VMs, and more for purposes of: (a) geographic distribution, (b) legal requirements, (c) capacity scaling, and/or (d) cost optimization; and (iii) the end user can't just get a report from each platform's metering solution and combine: (a) different platforms will not identify processes as the same 'workload', (b) different platforms will meter different metrics (names, units, etc.) for platform cost rather than application licensing, and (c) ten (10) cores on one platform utilized on Monday plus 10 cores on another platform utilized on Friday does not equal 20 cores used.

Figure 5:
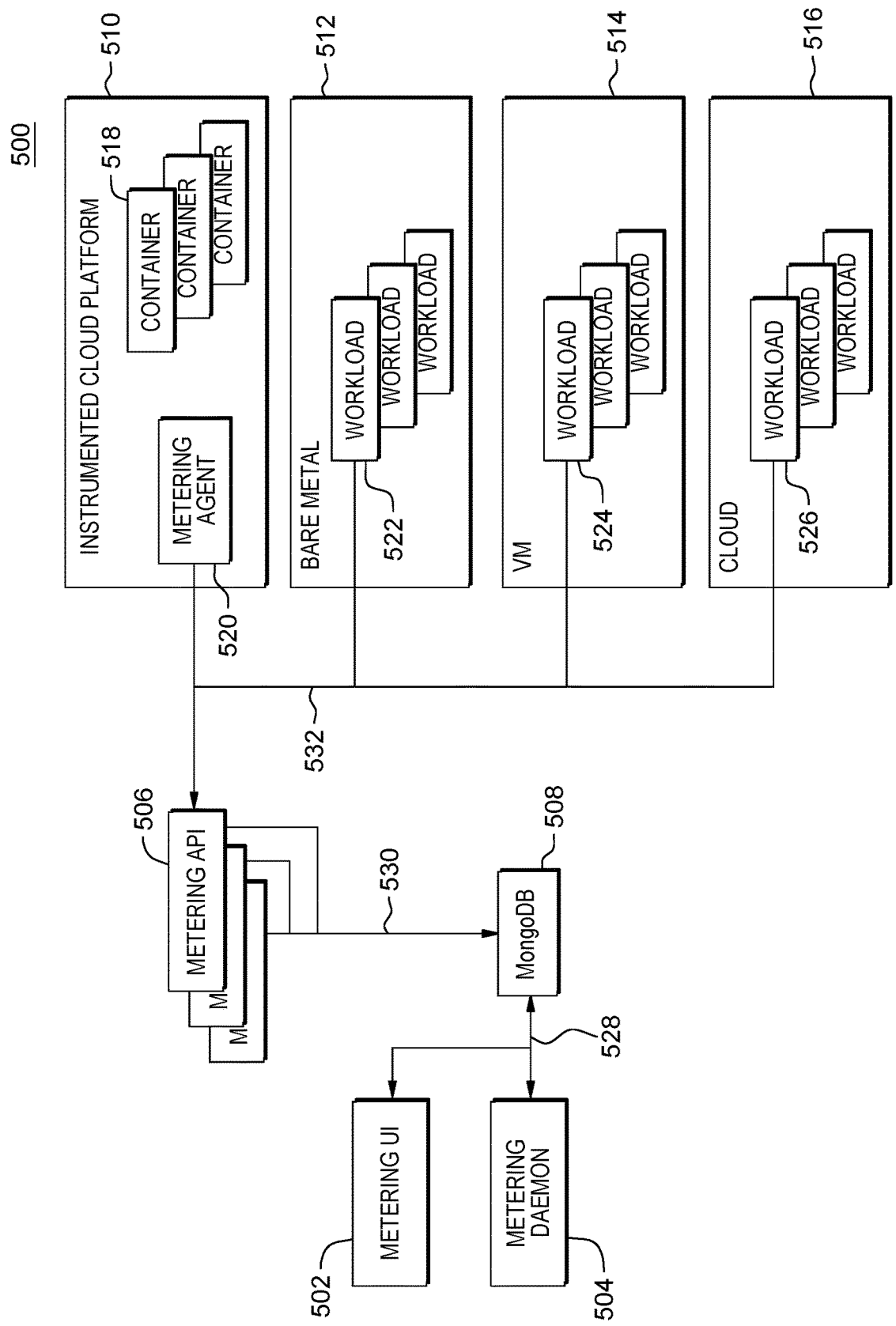
FIG. 5 is a block diagram view of a second embodiment of a system according to the present invention.

FIG. 5 shows system 500 which includes: metering UI (user interface) 502, metering daemon 504; metering APIs (application program interfaces) 506; datastore 508, hosting environments 510, 512, 514 and 516; and communication paths 528, 530 and 532. Hosting environment 510 (Instrumented Cloud Platform) contains containers 518 and metering agent 520, hosting environment 512 (Bare Metal) contains workloads 522, hosting environment 514 (VM) contains workloads 524 and hosting environment 516 (Cloud) contains workloads 526.

The role of metering UI 502 is to provide visibility into current and historical metering data, including which applications are being metered, what metrics are being collected, trends in metered values, and measurement against desired targets. Metering UI 502 also allows generation of readable and downloadable reports of total metered usage.

The role of metering daemon 504 is to continually monitor and perform aggregation on data added to the datastore 508.

The role of metering APIs 506 is to provide endpoints to which data can be sent. On receiving data, APIs 506 perform any necessary data normalization and formatting and store in the datastore 508. APIs 506 endpoints also enforce authentication to provide security and reliability.

The role of datastore 508 is to store metrics from each workload and to store aggregations of metrics for all workloads forming each application. The stored and aggregated data allows generation of UIs and reports for billing.

The role of hosting environments 510, 521, 514, 516 is to execute the ephemeral workloads that compose an application. The environment manages the lifecycle of each workload including when each workload is executed or terminated. The hosting environments also provide the necessary resources for a workload to run including processing units (CPUs), memory, persistent storage (disks), network access, and more.

The role of metering agent 520 is to collect metrics from containers 518. Metering agent 520 is used to collect metrics when the workload itself is not instrumented to report its own metrics. This approach can be used with workloads in any hosting environment, and is shown with containers only as an example. Containerized workloads can also be instrumented to report their own metrics to APIs 506 directly and avoid the need to use a metering agent.

Some embodiments of the present invention may include one, or more, of the following features, characteristics and/or advantages: (i) focuses on combining utilization metrics across all the platforms/providers to identify total utilization; (ii) focuses on metering metrics that are duration based (for example, CPU cycles in a 5 minute interval), collected across dissimilar platforms, and analyzed based on concurrency; (iii) address the challenges of metering applications that can shift across multiple platforms/clouds; and/or (iv) focuses on cross-platform/cloud metering.

Some embodiments of the present invention may include one, or more, of the following features, characteristics and/or advantages: (i) software applications can run across many distributed platforms including on premise installations, virtual machines, private cloud installations, and public cloud installations; (ii) each platform will often have different ways of reporting core usage; and/or (iii) companies can track and charge based on the processor core usage for applications, and cap based on duration, not just total core-hours.

Some embodiments of the present invention may include one, or more, of the following features, characteristics and/or advantages: (i) existing approaches discover and meter core usage for a single platform; (ii) the data is not analyzed for concurrent usage across platforms and thus cannot be capped on a time basis; that is, existing approaches can only cap based on core-hours, and cannot apply a cap based only on hours; (iii) can discover and meter concurrent usage across all of the distributed platforms and can apply time-based caps to the usage data, or other concurrent-usage based aggregation; and/or (iv) allows metering short-lived/transient workloads that run on multiple platforms and can dynamically move and/or be portable between platforms.

A first example of the present invention includes the following features: (i) database application can be running across different availability zones, for example on a public cloud in North America and a private cloud in Australia simultaneously; (ii) as demand increases in North America, more replicas of the database can be dynamically started in the public cloud, while the private cloud in Australia reduces replicas; (iii) the metering service collects the data from both and normalizes it to provide total usage for the database regardless of whether it is running on one cloud or five, or on VM's or bare metal servers; and/or (iv) metrics collected by each cloud's native usage metering would not be able to provide total application usage.

A second example of the present invention includes the following features: (i) the database can be running in a customer's data center using the metering service; (ii) the database can later be ported/moved to public cloud; and/or (iii) the metering service will continue to monitor the usage consistently (for example, an application or an applications components could be running on a combination of multiple platforms and reduce or increase the number of components running on each platform based on load, costs, geographic distribution of load, etc.); and/or (iv) being able to measure usage across platforms while still taking into account concurrency (not as simple as taking measurements from each platform and applying a weighted average afterwards).

Some embodiments of the present invention may include one, or more, of the following features, characteristics and/or advantages: (i) running a plurality of instances of an application in a plurality of cloud computing environments; (ii) for each given instance of the plurality of instances, performing, by the given instance, a respectively corresponding set of workload(s); (iii) for each given instance of the plurality of instances, collecting metering data corresponding to the number of cores available to the given instance in performing the respectively corresponding set of workload(s); and/or (iv) combining the metering data from each instance of the plurality of instances to determine a total core availability metric value wherein the plurality of cloud computing environments include at least two of the following types: IBM public cloud, IBM private cloud, Amazon cloud, Microsoft cloud, and privately hosted cluster.

Some embodiments of the present invention are focused on combining utilization metrics across all the platforms/providers to identify total utilization.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method (CIM) comprising:
running a first portion of an application on behalf of a first client on a first non-cloud platform;
during the running of the first portion, monitoring the running of the first portion to determine a first set of metered parameter value(s) respectively corresponding to a set of parameter(s);
running a second portion of the application on behalf of the first client on a first cloud platform;
during the running of the second portion, monitoring the running of the second portion to determine a second set of metered parameter value(s) respectively corresponding to the set of parameter(s);
determining aggregate parameter value(s) with the aggregation including combining at least the parameter value(s) of the first and second sets of parameter value(s); and
measuring usage across at least the first cloud platform and first non-cloud platform while still taking into account concurrency.

2. The CIM of claim 1 wherein:
the set of parameters includes a first parameter; and
the first parameter is one of the following: total core hours, total hours, concurrent maximum available cores, and concurrent maximum used cores.

3. The CIM of claim 1 wherein the first portion includes a plurality of ephemeral workloads.

4. The CIM of claim 1 wherein the second portion includes a plurality of ephemeral workloads.

5. The CIM of claim 1 wherein the first portion includes a first workload which is a virtual machine that runs on bare metal.

6. The CIM of claim 1 wherein the first portion includes a first workload which is a virtual machine that runs on a host operating system.

7. The CIM of claim 1 wherein the first portion includes a first workload which is a virtual machine that runs on a kernel.

8. The CIM of claim 1 further comprising:
billing the first client based, at least in part, upon the aggregate parameter value(s).

9. A computer-implemented method (CIM) comprising:
running a first portion of an application on behalf of a first client on a first non-cloud platform;
during the running of the first portion, monitoring the running of the first portion to determine a first set of metered parameter value(s) respectively corresponding to a set of parameter(s);
running a second portion of the application on behalf of the first client on a first cloud platform;
during the running of the second portion, monitoring the running of the second portion to determine a second set of metered parameter value(s) respectively corresponding to the set of parameter(s);
determining aggregate parameter value(s) with the aggregation including combining at least the parameter value(s) of the first and second sets of parameter value(s); and
measuring usage across at least the first cloud platform and first non-cloud platform while still taking into account concurrency;
wherein the monitoring the running of the first portion includes running a plurality of workloads, and, for each given workload of the plurality of workloads:
at commencement of performance of the given workload, sending a startup payload with identifying details and details about type of metrics to be sent and how aggregation of metrics,
during execution given workload, intermittently sending a usage payload with start time, end time and metric values, and
at termination of the given workload, sending a final payload.

10. The CIM of claim 9 wherein at least some of the workloads of the plurality of workloads are virtual machines.

11. The CIM of claim 9 wherein at least some of the workloads of the plurality of workloads are containers.

12. A computer-implemented method (CIM) comprising:
running a first portion of an application on behalf of a first client on a first non-cloud platform;
during the running of the first portion, monitoring the running of the first portion to determine a first set of metered parameter value(s) respectively corresponding to a set of parameter(s);
running a second portion of the application on behalf of the first client on a first cloud platform;
during the running of the second portion, monitoring the running of the second portion to determine a second set of metered parameter value(s) respectively corresponding to the set of parameter(s);
determining aggregate parameter value(s) with the aggregation including combining at least the parameter value(s) of the first and second sets of parameter value(s); and
measuring usage across at least the first cloud platform and first non-cloud platform while still taking into account concurrency;
wherein the monitoring the running of the second portion includes running a plurality of workloads, and, for each given workload of the plurality of workloads:
at commencement of performance of the given workload, sending a startup payload with identifying details and details about type of metrics to be sent and how aggregation of metrics,
during execution given workload, intermittently sending a usage payload with start time, end time and metric values, and
at termination of the given workload, sending a final payload.

13. The CIM of claim 12 wherein at least some of the workloads of the plurality of workloads are virtual machines.

14. The CIM of claim 12 wherein at least some of the workloads of the plurality of workloads are containers.

* * * * *